Sept. 17, 1963  F. BUCHWALD ETAL  3,104,078
STATION FOR PNEUMATIC TUBE CARRIER SYSTEM
Filed Dec. 2, 1960  2 Sheets-Sheet 2

INVENTORS
Fritz Buchwald
Karl Huber

BY Paul W. Hemminger
Agent

United States Patent Office 3,104,078
Patented Sept. 17, 1963

3,104,078
STATION FOR PNEUMATIC TUBE
CARRIER SYSTEM
Fritz Buchwald, Berlin-Lankwitz, and Karl Hubner, Berlin-Britz, Germany, assignors to International Standard Electric Corporation, New York, N.Y., a corporation of Delaware
Filed Dec. 2, 1960, Ser. No. 73,375
Claims priority, application Germany Dec. 14, 1959
12 Claims. (Cl. 243—19)

The invention relates to an arrangement for the random passing, receiving or sending of pneumatic tube carriers in pneumatic tube systems and more particularly to the random passing receiving or sending of pneumatic tube carriers of relatively heavy weight in a high speed pneumatic tube system. The prior art pneumatic tube carriers are ejected from the pneumatic tube system by mechanical deflectors at the receiving stations. This mechanical deflector is either operated manually at the receiving station, or controlled either from the sending station, or by routing contacts arranged on the carrier itself. After the carrier has passed the deflector, the deflector is returned to normal.

Likewise when a carrier is to be dispatched from a sending station arranged on a forwarding tube line, the carrier is brought into the forwarding tube line via a mechanical deflector tangentially joining the forwarding tube. A system employing mechanical deflectors has the advantage that the forwarding tube line, immediately after the passing of the carrier to be received or dispatched, is again free for the passage of further carriers not destined for this station. The disadvantages of this system, however, reside in the sensitivity of the moving parts and in the danger of damaging the system by the travelling carriers. Since the carriers have to travel at a very high speed, in order to maintain the high efficiency of the system, considerable shocks are caused by the carriers at all parts of the line deviating from the straight line of the conveying channel. As long as the weight of the carriers is small, in other words, as long as the carriers have a small diameter, it is possible to design the mechanical deflectors with a sufficient stability in an economical way. However, as soon as the diameters of the carriers are enlarged, and as soon as the weight of the carriers is increased to a sufficient extent, for example, squared, the employment of such mechanical deflector is entailed by difficulties.

The pneumatic tube stations of the conventional type also reduce the speed of those carriers which are not destined for this particular station, and stops them before they are forwarded into the further channel of the system. This method is only appropriate in the case of lightweight carriers. The bends which are necessary at the stations, are subjected to a considerable wear by larger-size carriers. The braking and stopping of the carriers has a reducing effect upon the efficiency of the entire system, and a portion of the driving energy is lost.

In conventional systems the compressed air column which is produced when a carrier enters a closed tube section, is used for retarding the carriers. In order to still maintain the operation of dispatching carriers in other parts of the system in spite of the retardation of one, or of some carriers, and in order to make the retardation more effective, it is also known to divert the operating air, in the case of a latched or shut-off forwarding tube line section, around the latching point. This necessary diversion point is equipped with adjustable valves which become effective together with the latching.

The invention provides an arrangement for randomly permitting the passage, the stopping or the sending of pneumatic tube carriers, in particular such ones of the heavy type, at a point of the forwarding tube line which is not featured by the disadvantages of the conventional types of arrangements.

The invention eliminates the need of bends in the system by utilizing a straight tube section in which the inventive arrangement is disposed. In this straight forwarding tube section a chamber is provided which is capable of being locked or shut-off at both ends. A locking or latching arrangement is located at the entrance or front of the chamber and a similar locking or latching arrangement is located at the exit or rear of the chamber. It is arranged in such a way that the chamber, in the unlocked (unlatched) condition, can be passed through by the travelling carriers at an undiminished or unchanged speed. The chamber is capable of stopping the carriers when locked at the rear end by effecting a compression of the air column in front of the carrier and, consequently, a retardation of the carrier. A locking or latching at the front end of the chamber can be performed when the received carriers have to be removed and when the carriers to be dispatched have to be inserted.

In this lockable section of the forwarding tube line, and just after the branching of the air diversion, an overpressure valve is arranged, by which the increase of pressure in the locked tube section, which is caused by the entering carrier, is reduced to such an extent that the carrier is not noticeably moved backwards by the action of the compressed air column from the reached stopping position. In this way the carrier is brought to a standstill almost in front of the latching or shut-off arrangement and may be removed at this point. The exact location of the standstill of the carriers, however, is only sufficiently defined if all of the employed carriers have the same weight and the same frictional resistance, and if the operating-air conditions are constant. However, since this cannot be realized in practice, and since it is necessary to ensure that the carriers can always be removed at the same point, an additional auxiliary air line is provided, through which the air flows into the section of the forwarding tube line which is near the latching or shut-off point. This auxiliary line is switched to a source of air shortly after the entering of the carrier. This can be accomplished by the action of the retardation of the carrier. The source of air is of such a force that the carrier is slowly moved to the latching point.

It is possible to use a separate source of air for performing the fine positioning but it is also possible to use the air of the pneumatic tube system. In order to use the air of the pneumatic tube system the additional air line is connected with the operating-air diversion at a point where the latter is preceded by a throttle or choke valve. This choke or throttle valve is adjusted so that a pressure difference is produced at the valve which is sufficient for moving the carrier to the latching point. In this case the power of the operating-air generator must be higher by the amount of this pressure difference than actually is necessary for driving the carriers.

For removing the carriers from the forwarding tube line, or for inserting the carriers into the forwarding tube line, a chamber is provided immediately in front of the locking or latching point, and is incorporated into the straight section of the tube. This chamber is appropriately capable of being pushed or swivelled out of the way of the forwarding tube line. For example, several such chambers are mounted in a revolver-like drum, which is arranged in such a way that any one of the chambers can be brought into alignment with the forwarding tube line. When a chamber is brought into the operating position the auxiliary air-line runs into this chamber.

Also, at its entering end, the chamber is separated from the intake section of the forwarding tube line by a latching arrangement. This latching arrangement is actuated as soon as the carrier has entered the chamber. In this case the auxiliary air-line is split into two channels, of which the one permits the air to flow into the chamber, and of which the other one joins the forwarding tube line in front of the intake-latching arrangement. The last mentioned channel serves to move a further stopped carrier close to the chamber and into a waiting position, in case the chamber itself is occupied. When the chamber is emptied or an empty chamber is provided the intake-latching is operated and the carrier is completely moved or pulled into the chamber by the air pressure differential provided through the above mentioned first channel.

For controlling the inventive arrangement it is possible to couple the individual elements to one another. First of all the first or rear latching arrangement is coupled to a valve in the operating air-line in such a way that the valve is opened upon closing the latching arrangement. The latching itself is dependent upon the fact that no carriers are located in this particular section of the arrangement. For this reason, this section is supervised by a counting device, which is adapted to ascertain whether or not this section is occupied by a carrier. The latching arrangement can only be actuated if this section is found to be free of carriers. The actuation of the latching arrangement disposed ahead of the removing point is dependent upon the arrival of a carrier. The switching valve, which is adapted to apply the auxiliary air-line to one of the two channels, operates in dependency upon the second latch, which forms the entrance to the removing chamber. In the event of an occupied chamber, the auxiliary channel draws air off in front the chamber, so that a further carrier is put into the waiting position.

The above mentioned and other features and objects of this invention will become more apparent by referring to the following description taken in conjunction with the accompanying drawings in which.

Figure 1:
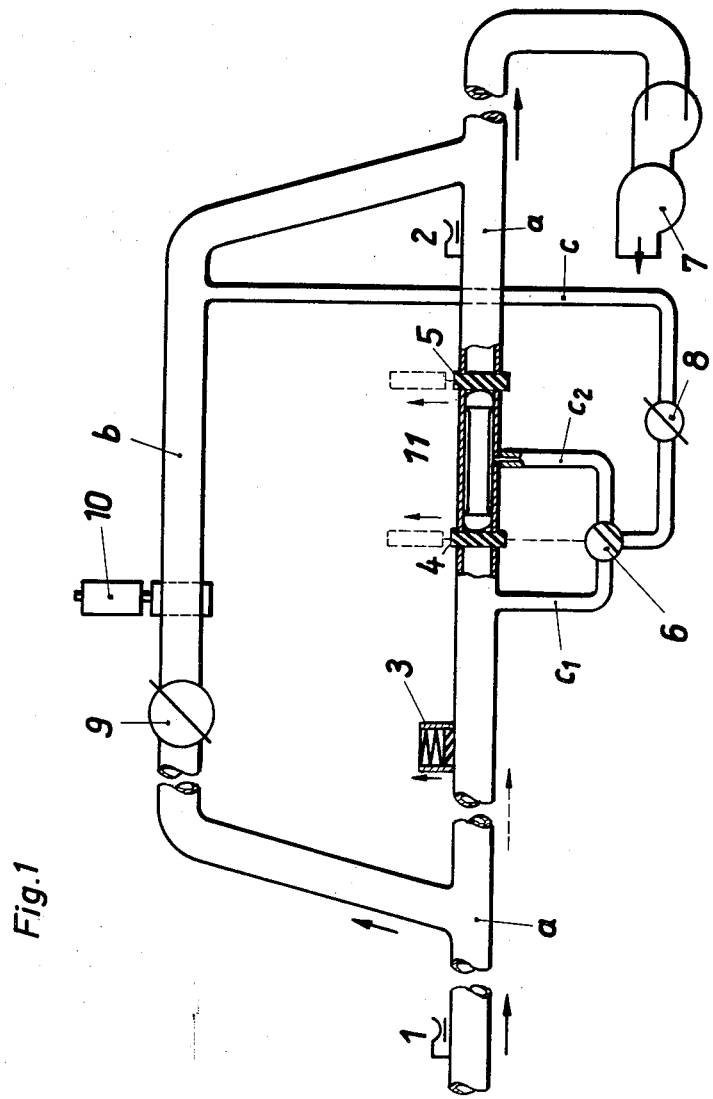
FIG. 1 is a plan view of an arrangement in accordance with the invention.

Referring now to FIGURE 1, the inventive arrangement is disposed in a straight section of the forwarding tube line $a$ which, on the left-hand side, is connected to a sending station, not shown, and on the right-hand side, with a source of air 7. This air source creates sufficient pressure to move the carriers through the system in the direction of the arrows. A random number of arrangements for stopping and sending, as shown in the drawing, may be incorporated into the entire pneumatic tube system. In front of the entrance and behind the exit of the entire arrangement the devices 1 and 2 are arranged which are controlled by the carriers, and which act upon a counting device, not shown, serving to determine the number of carriers located between the points 1 and 2 at every time position. After the device 1 the working-air diversion $b$ is branched off from the forwarding tube line $a$, and is reconnected with this tube line after the device 2. Reference numeral 3 indicates the overpressure valve which serves to reduce the compression of the air column in front of the arriving carrier. Reference numeral 4 indicates the device for latching the forwarding tube line in front of the removing point, and reference numeral 5 indicates the device for latching the forwarding tube line after the removing point. The additional auxiliary air-line, which is split-up into the channels $c_1$ and $c_2$ immediately before joining the forwarding tube line, is indicated by the reference $c$. The valve which joins the auxiliary air line $c$ with either the channel $c_1$ or $c_2$ is indicated by the reference numeral 6. In line $c$ the controllable valve 8 is inserted. Simultaneous with the operation of the latching device 5 the valve 10, in the operating-air diversion $b$ is operated. Likewise the air throttle 9 is located in line $b$. It produces the pressure difference for permitting the carriers to enter the latching arrangements. Reference numeral 11 indicates the chamber which is of the type capable of being either swivelled out or displaced. This chamber can be limited by the latching arrangements 4 and 5. In the swivelled-out condition the carrier may be removed either in the axial direction, or otherwise in the radial direction by opening the enclosure of the chamber. The arrangement operates a follows:

In case a carrier is supposed to pass through the arrangement, the latching devices 4 and 5 remain open, and the valve 10 is closed. When a carrier is intended to be dispatched, then it is inserted into the chamber 11, after the latching devices 4 and 5 have been closed. If the chamber 11 is in the operating position, then the latches are opened, and the valve 10 is closed, and the operating air thus moves the carrier in the direction as indicated by the arrow. However, if a carrier is intended to be received, then the latch 5 is closed, and causes the valve 10 to be opened. At a high speed the carrier is moved in the forwarding tube $a$ towards the latching device 5, and is thus retarded by the produced air cushion. If the overpressure of the air exceeds a predetermined value, then the overpressure valve 3 operates until the overpressure is equalized or compensated. At about the same location in front of the latch 4 each carrier comes to a standstill. If latch 4 is open, valve 8 is open, and valve 6 connects $c$ with $c_2$. The arrived carrier is then permitted to enter the chamber 11, whereupon the latch 4 is closed. Now the chamber may be moved out of its operating position, i.e. may either be displaced or swivelled, and the carrier may be removed therefrom. If a further carrier arrives at the tube section $a$, before the chamber 11 is ready to receive a new carrier, then this carrier has to be brought into the waiting position in front of the latch 4. The carrier-counting device, which is controlled by the contacts 1 and 2, then effects a reversal of the valve 8 which had closed when latch 4 closed. This causes the carrier to be finely positioned in front of the latch 4, because the auxiliary air-line $c$ is now connected with the line section or channel $c_1$ since latch 4 is closed. After the first carrier has been removed from the chamber 11, in the course of which a contact operating in analogy with contact 2 has been operated, either the first one or both of the latches 4 and 5 are opened. This depends on whether the following carrier is supposed to be removed, or whether this carrier is destined for another receiving station. Upon opening both latches the valves 8 and 10 are closed, provided that it has not already been determined by the counting device 1, 2 that further carriers have accumulated in the meantime.

Figure 2A:
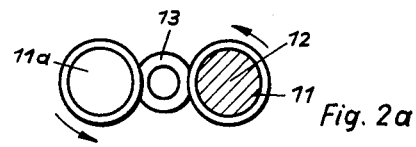
FIGS 2 and 2a show a revolver like drum containing two chambers for swivelling respectively one of the chambers contained in the drum, out of the pneumatic tube system, and for swivelling the other chamber into the system, and vice versa.
Figure 2:
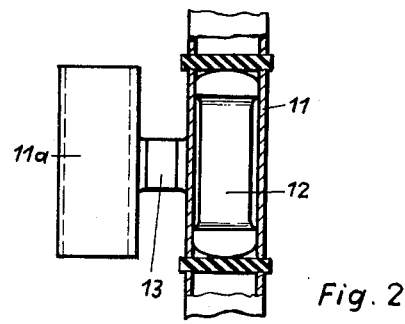

FIGS. 2 and 2a show an arrangement for either removing a pneumatic tube carrier from the system or inserting it into the system. Chamber 11 is connected to a second similar chamber 11a via a connecting member 13. This connecting member 13 is capable of being turned about its axis in such a manner that chamber 11 can be replaced by chamber 11a and vice versa.

Figure 3A:
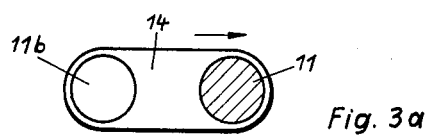
FIGS. 3 and 3a show an arrangement for inserting and removing carriers into two chambers capable of being displaced perpendicularly to the tube axis.
Figure 3:
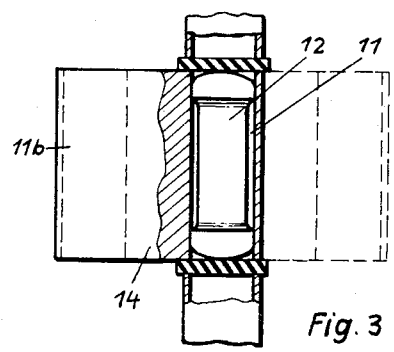

FIGS. 3 and 3a illustrate another arrangement for the removal or insertion of pneumatic tube carriers into the system. Both the chambers 11 and 11b are rigidly connected to form a unit structure capable of being displaced in a direction perpendicular to the axis of the forwarding tube line $a$. The displacement is effected in such a manner that after it has been accomplished one of the chambers 11 or 11b extends in axially coincident relation to the forwarding tube line. The other chamber is parallel to and adjacent to the forwarding tube line *a* and a carrier can be removed from it or inserted into it. After a carrier has been inserted into the adjacent chamber, the chamber can be moved perpendicularly to the forwarding tube *a*, thus moving the rigidly attached chamber which was axially aligned in the tube *a* so that it will be adjacent to the tube *a* on the opposite side of tube *a* and parallel thereto.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. A multi-station pneumatic tube system having a forwarding line for transporting carriers between desired ones of said stations, each said station comprising a chamber located in said forwarding line and having entrance valve means and exit valve means for controlling the passing, stopping and sending of carriers, bypass means in each station operable to divert the operating air around said station upon the closing of said exit valve means, means for closing the exit valve of said chamber to cause a carrier to come to a stop, means for operating said bypass means when said exit valve is closed, means for positioning a stopped carrier within said chamber, means for closing the entrance valve of said chamber to isolate the said chamber from said forwarding line to permit the removal and insertion of carriers therein, and means responsive to the opening of said entrance and exit valve means and the closing of said bypass means for dispatching a carrier from said station.

2. Apparatus according to claim 1 wherein said means for positioning a stopped carrier within said chamber comprises an auxiliary air channel connected to said chamber and so pressurized as to allow an arriving carrier to slowly move into position within said chamber.

3. Apparatus according to claim 2 wherein said auxiliary air channel joins the air bypass at a point where a lower pressure exists than the air pressure in the pneumatic system which pressure is used as the pressure in said auxiliary channel.

4. Apparatus according to claim 3, wherein the air pressure in the pneumatic system is higher than necessary for dispatching carriers within the system by the amount of the pressure drop for said auxiliary channel.

5. Apparatus according to claim 1 further comprising a revolver-like drum containing several of said chambers located with respect to said forwarding tube line so that selected chambers can be brought into alignment with said forwarding tube line.

6. Apparatus according to claim 5 wherein said auxiliary air channel is connected to the respective chamber of said drum which is in alignment with said forwarding tube line.

7. Apparatus according to claim 6 wherein said auxiliary channel has a further branch channel operably connected to said auxiliary channel by a control valve, said branch channel connected to said forwarding tube line in front of said chamber to bring a carrier into a waiting position when said chamber is occupied.

8. Apparatus according to claim 1 further comprising a counting device operable by a contact located at the input and output of the bypassed forwarding tube line, said counter being further operated by a contact operating in response to a carrier which also causes said entrance valve of said chamber to open.

9. Apparatus according to claim 8 wherein said exit valve of said chamber is so coupled to said counter that said exit valve can only be operated if the counting device has ascertained that no carrier is located in the bypassed forwarding tube line section.

10. Apparatus according to claim 1 further comprising an overpressure valve located within the section of the forwarding tube line around which the air is bypassed and in front of the chamber so that the compressed air column in front of an arriving carrier to be stopped is reduced to such an extent that the carrier is not noticeably moved backwards.

11. Apparatus according to claim 1 wherein said chamber for removing a carrier from or for inserting a carrier into the pneumatic tube system further comprises a swivel for removing said chamber from the forwarding tube line.

12. Apparatus according to claim 1 wherein the air bypass contains a blocking valve which is connected to said exit valve of said chamber so that when said exit valve closes said blocking valve opens and when said exit valve opens said blocking valve closes.

References Cited in the file of this patent

UNITED STATES PATENTS

| | | |
|---|---|---|
| 268,715 | Needham | Dec. 5, 1882 |
| 800,884 | Stoddard | Oct. 3, 1905 |